June 6, 1950

F. E. GAENG 2,510,498

CONTINUOUS RAPID BEER OXIDIZING
AND CLARIFYING METHOD

Filed June 21, 1947

INVENTOR
Frank E. Gaeng
By Robert E. Burns
ATTORNEY

June 6, 1950  F. E. GAENG  2,510,498
CONTINUOUS RAPID BEER OXIDIZING
AND CLARIFYING METHOD
Filed June 21, 1947  2 Sheets-Sheet 2

INVENTOR
Frank E. Gaeng
By Robert E. Burns
ATTORNEY

Patented June 6, 1950

2,510,498

UNITED STATES PATENT OFFICE 2,510,498

CONTINUOUS RAPID BEER OXIDIZING AND CLARIFYING METHOD

Frank E. Gaeng, Staefa-Zurich, Switzerland, assignor to Societe Alfa-Laval, Paris, France, a French society, and Societe Belge Alfa-Laval, Brussels, Belgium, a Belgian society Application June 21, 1947, Serial No. 756,258
In Belgium July 3, 1946

1 Claim. (Cl. 99—48)

This invention has for its object a method of quickly maturating beer.

According to known methods beer is maturated in storage vessels. What is accomplished slowly in the course of long weeks can be obtained instantaneously by the method according to this invention.

By this method raw beer is maturated by centrifugally carrying out its clarification, that is, the removal of the yeast and yeast spores therein, and its de-gassing, that is, the removal of the carbon dioxide present.

My invention consists in subjecting the raw beer as it comes out of the fermentation butt to a re-heating to a temperature of about 15° C., then removing the carbon dioxide, the yeast and the micelles contained therein in a centrifuge through which an oxidizing gas is flowed, then cooling the beer and saturating it with pressure carbon dioxide.

The course of operations is as follows:

The raw beer coming from the fermentation tank is heated up to 15° C. and stripped on one hand from the yeast and yeast spores arising from the fermentation and on the other hand from the carbon dioxide present, oxidized with filtered air enriched with oxygen, then cooled down and contingently admixed with krausen; following this the oxidizing mixture is eliminated and the beer is saturated with carbon dioxide before it is sent into a finishing tank from which it will be racked.

The invention is also concerned with a plant for maturating beer by the above-defined method. The various steps of said method may be carried out successively in separate apparatus; however, according to a particularity of the invention, the raw beer is clarified, de-gassed and oxidized simultaneously in a centrifuge.

The invention will be described more specifically by way of non-limitary example in the following, reference being had to the appended drawing in which.

Figure 1:
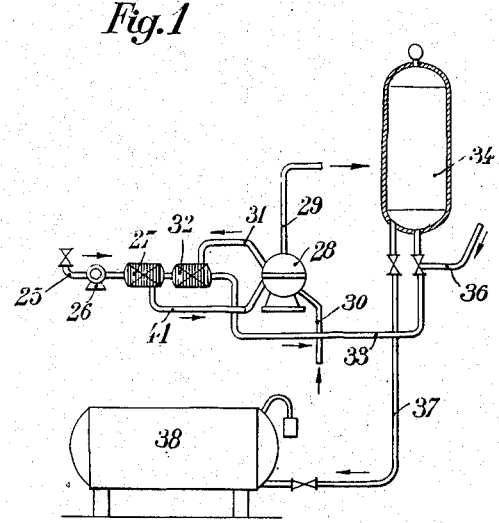
Figure 1 is a diagrammatical representation of a plant suitable for the performance of the method according to this invention.

The raw beer coming from the fermentation vat through a pipe 25 is forced by a pump 26 into a plate heater 27 in which its temperature is raised to about 15° C. It then flows through a pipe 41 into a centrifuge 28 in which it is clarified and de-gassed, that is, stripped from the carbon dioxide resulting from its fermentation, in addition to which it is oxidized.

The said carbon dioxide loaded with the aldehydes and esters present in the raw beer flows out in the course of the centrifuging through a pipe 29 contingently connected with a suction apparatus (not shown). An air-ozone mixture is introduced through a pipe 30 into the centrifuge 28. The said oxidizing mixture causes the precipitation of the metastable micelles and the resins. Owing to the centrifugal effect the beer is stripped from the yeast present in suspension, the resins and the flocculated nitrogenous substances.

As the beer, which is free from carbon dioxide and contains large amounts of air, comes out of the centrifuge 28 is led through a pipe 31 into a plate cooler 32 in which it is chilled and contingently admixed with krausen, whereafter it is led through a pipe 33 into a saturation tank 34. Once the latter is filled with beer the air and ozone present in the same are driven off with the aid of carbon dioxide led in through a pipe 36. Following the elimination of the oxidizing mixture the beer is saturated with pressure carbon dioxide. Such saturation with the aid of carbon dioxide at a temperature of 0° C. completes the clarification of the beer. The carbon dioxide seems to unite with the soluble albumins, whereby the beer is helped to reach full maturity.

Contingently, proteolytic ferments and/or adsorbents such as activated carbon are added to the beer which is then allowed to stand for a short while in a finishing tank 38 into which it is led through a pipe 37 and in which the carbon dioxide pressure is released down to casking pressure whereafter it can be filtered or centrifuged and finally racked.

Figure 2:
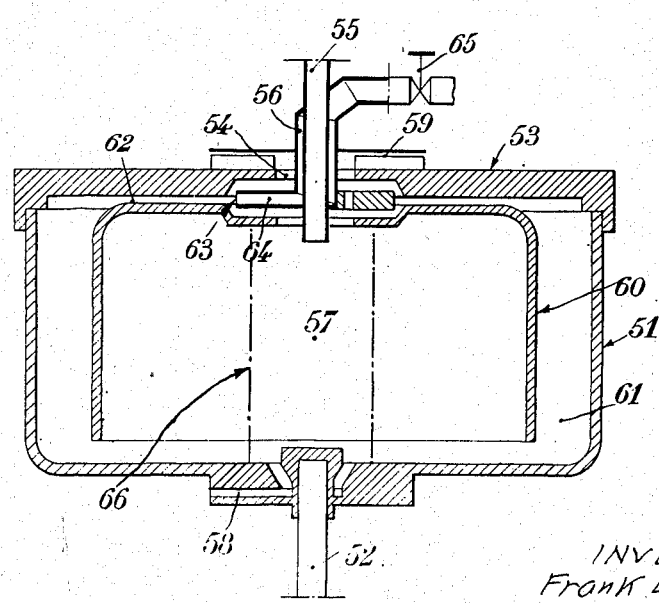
Figure 2 is a vertical section of a centrifuge.
Figure 3:
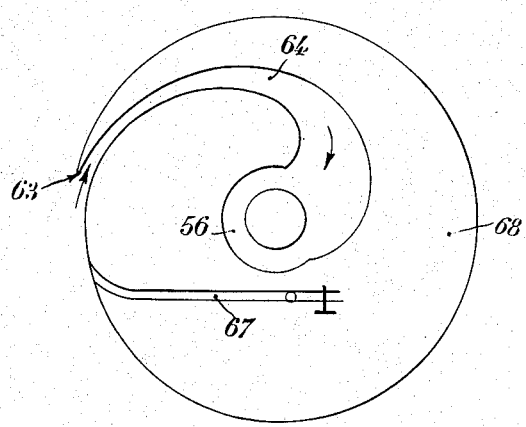
Figure 3 is a horizontal sectional view.

The centrifuge illustrated in Fig. 2 is provided with means enabling to remove the carbon dioxide present in the raw beer and to admix the latter with an oxidizing agent such as filtered air as such or enriched with oxygen or ozone, or a mixture of oxygen with ozone.

The bowl 51 of the centrifuge is whirled at high speed by means of a shaft 52. It is provided with a cover 53 formed with a central hole 54 through which project a raw beer intake pipe 55 and a pipe 56 through which the de-gassed and oxidized beer flows out.

From the fermentation vats the re-heated raw beer flows into the bowl 51 through a pipe 55. By falling in the inside of said bowl it is atomized and thus releases the carbon dioxide same was saturated with. The gas escapes from the bowl 51 through the peripheral portion of the hole 54. Preferably, said gas is driven off by the air flow created by pumps arranged at either end of the cavity 57 resulting from the centrifugal effect, viz.: a centripetal pump 58 and a centrifugal pump 59. As shown in Fig. 2 the centripetal pump is arranged in the bottom of the bowl 51 while the centrifugal pump is arranged in the top of the same; the reverse arrangement in which the centrifugal pump is located in the bottom and the centripetal pump in the top is also possible; both arrangements enable the pumps being effective by rotation in one end the same direction.

Figure 4:
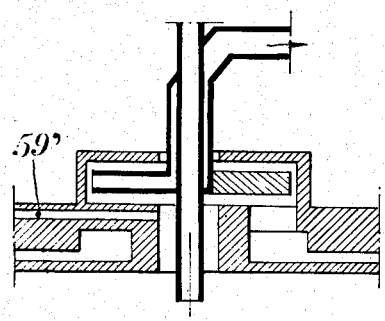
Figure 4 is a vertical section of a modified detail.

According to the modification shown in Fig. 4 the centrifugal pump 59 is constituted by one or several ducts 59' provided in the cover of the rotor and extending from the bore 54 to the periphery of the cover or at least to a sufficient distance from the centre. Said channels or ducts may be straight or, preferably, curved contrawise to the direction of rotation of the rotor.

The beer thus stripped from carbon dioxide flows below the lower edge of the bell-shape member 60 towards the peripheral portion 61 of the bowl 51. The yeast and yeast spores present in suspension settle. The beer is led through ducts 62 to the orifice 63 of a centripetal pump, flows through the channel 64 and escapes through the delivery pipe 56. A valve 65 interposed in said delivery pipe enables to vary the delivery pressure of the clarified beer and consequently the radial level of the beer in the rotor of the centrifuge.

Filtered air contingently enriched in oxygen is introduced through a duct 67 in the part 68 of the centripetal pump into the clarified beer at the instant same is admitted in the orifice 63 in the centripetal pump.

What I claim as my invention and desire to secure by Letters Patent is:

A method of rapidly maturating beer in continuous cycle, which comprises passing the raw beer from a fermentation zone at a temperature of about 15° C. to a centrifuging zone, passing air and ozone through the beer in the centrifuging zone, stripping the beer of carbon dioxide, yeasts, resins and flocculated nitrogen-containing substances, and oxidizing and maturating the raw beer, discharging the oxidized and maturated beer into a cooling zone, and cooling the beer before saturating it with carbon dioxide.

FRANK E. GAENG.

REFERENCES CITED

The following references are of record in the file of this patent:

UNITED STATES PATENTS

| Number | Name | Date |
|---|---|---|
| 414,673 | Zimmer | Nov. 12, 1889 |
| 608,744 | Alberger | Aug. 9, 1898 |
| 2,116,939 | Zahm et al. | May 10, 1938 |
| 2,179,941 | Lindgren | Nov. 14, 1939 |
| 2,253,647 | Persoons | Aug. 26, 1941 |
| 2,331,556 | Lindgren | Oct. 12, 1943 |